United States Patent
Rains et al.

(10) Patent No.: US 10,027,410 B2
(45) Date of Patent: Jul. 17, 2018

(54) SYSTEM AND METHOD USING A GATED RETRO-REFLECTOR FOR VISIBLE LIGHT UPLINK COMMUNICATION

(71) Applicant: ABL IP Holdiing LLC, Conyers, GA (US)

(72) Inventors: Jack C. Rains, Herndon, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 93 days.

(21) Appl. No.: 15/190,644

(22) Filed: Jun. 23, 2016

(65) Prior Publication Data
US 2017/0373752 A1   Dec. 28, 2017

(51) Int. Cl.
| | |
|---|---|
| *H04B 10/00* | (2013.01) |
| *H04B 10/116* | (2013.01) |
| *H04W 52/02* | (2009.01) |
| *H04N 5/225* | (2006.01) |
| *H04N 5/232* | (2006.01) |
| *H04N 5/376* | (2011.01) |
| *H04W 4/80* | (2018.01) |

(52) U.S. Cl.
CPC ......... *H04B 10/116* (2013.01); *H04N 5/2253* (2013.01); *H04N 5/2254* (2013.01); *H04N 5/23241* (2013.01); *H04N 5/3765* (2013.01); *H04W 4/80* (2018.02); *H04W 52/0229* (2013.01)

(58) Field of Classification Search
CPC .. H04B 10/116; H04B 5/2253; H04B 5/2254; H04B 5/23241; H04B 5/3765; H04B 5/80; H04W 4/008; H04W 52/0229
USPC .................................................. 398/115, 117
See application file for complete search history.

(56) References Cited

U.S. PATENT DOCUMENTS

| | | |
|---|---|---|
| 6,947,649 B2 | 9/2005 | Li |
| 7,583,901 B2 | 9/2009 | Nakagawa |
| 8,736,961 B2 | 5/2014 | Lydecker |
| 8,793,944 B2 | 8/2014 | Blomberg |
| 9,179,522 B2 | 11/2015 | Denoij |
| 2005/0018723 A1 | 1/2005 | Morita |

(Continued)

OTHER PUBLICATIONS

Przhonska et al., "Nonlinear light absorption of polymethine dyes in liquid and solid media", J. Opt. Soc. Am. B, vol. 15, No. 2, Feb. 1998, 8 pages.

(Continued)

*Primary Examiner* — Tesfaldet Bocure
(74) *Attorney, Agent, or Firm* — RatnerPrestia

(57) ABSTRACT

A device uses gated retro-reflectors to transmit uplink data in a visible light communication (VLC) system. The gated retro-reflector includes a retro-reflector and a gating shutter between the retro-reflector and a VLC light source. A light sensor receives VLC data at regular intervals in which a light pulse received during one of the intervals represents a first downloaded symbol and absence of a light pulse during another one of the intervals represents a second downloaded symbol. A controller controls the gating shutter to send uplink data from the device responsive to each received VLC light pulse. The controller opens the gating shutter during the reception of a VLC light pulse to upload a first uploaded symbol and closes the gating shutter during the reception of a VLC light pulse to upload a second uploaded symbol.

21 Claims, 7 Drawing Sheets

(56) References Cited

U.S. PATENT DOCUMENTS

| | | |
|---|---|---|
| 2006/0000911 A1 | 1/2006 | Stekel |
| 2006/0004547 A1* | 1/2006 | Mostafavi ............. A61B 6/541 |
| | | 702/189 |
| 2009/0058712 A1 | 3/2009 | Roes |
| 2010/0231997 A1 | 9/2010 | Fontecchio |
| 2011/0002695 A1 | 1/2011 | Choi |
| 2012/0262694 A1 | 10/2012 | Garey |
| 2013/0141554 A1 | 6/2013 | Ganick |
| 2013/0314795 A1 | 11/2013 | Weaver |
| 2014/0246690 A1 | 9/2014 | Moosburger |
| 2014/0252961 A1 | 9/2014 | Ramer |
| 2015/0043425 A1 | 2/2015 | Aggarwal |
| 2015/0147067 A1 | 5/2015 | Ryan |
| 2015/0271896 A1 | 9/2015 | Steiner |

OTHER PUBLICATIONS

Penzkofer et al., "Saturable Absorption Dynamics of a Cyanovinyl-Diethylaniline Dye", Chemical Physics Letters, Nov. 1990, 6 pages.
Hooman Mohseni, "High-performance surface-normal modulators based on stepped quantum wells", Proceedings of SPIE—The International Society of Optical Engineering, May 2005, 9 pages.
Goetz et al., "Modulating Retro-reflector Lasercom Systems at the Naval Research Laboratory", The 2010 Military Communications Conference, 2010, 7 pages.
Encyclopedia of Laser Physics and Technology, "Saturable Absorbers", uploaded from https://www.rp-photonics.com/saturable_absorbers.html, 2016, 4 pages.
U.S. Appl. No. 15/200,375, dated Jul. 1, 2016, 68 pages.

* cited by examiner

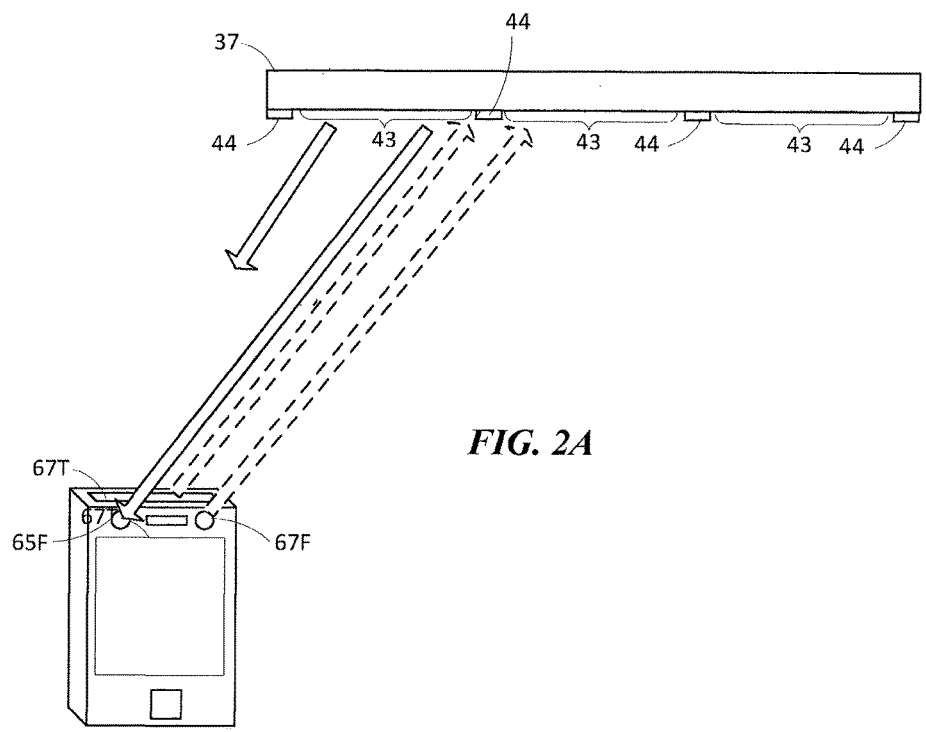
FIG. 2A
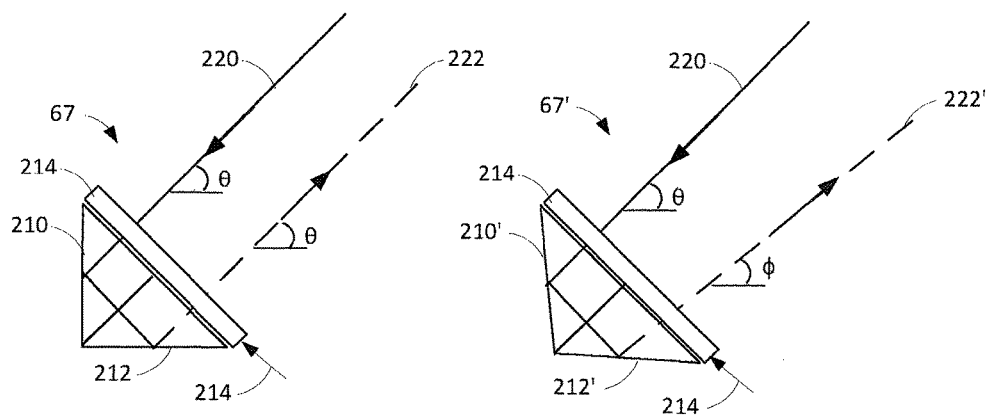
FIG. 2B  FIG. 2C

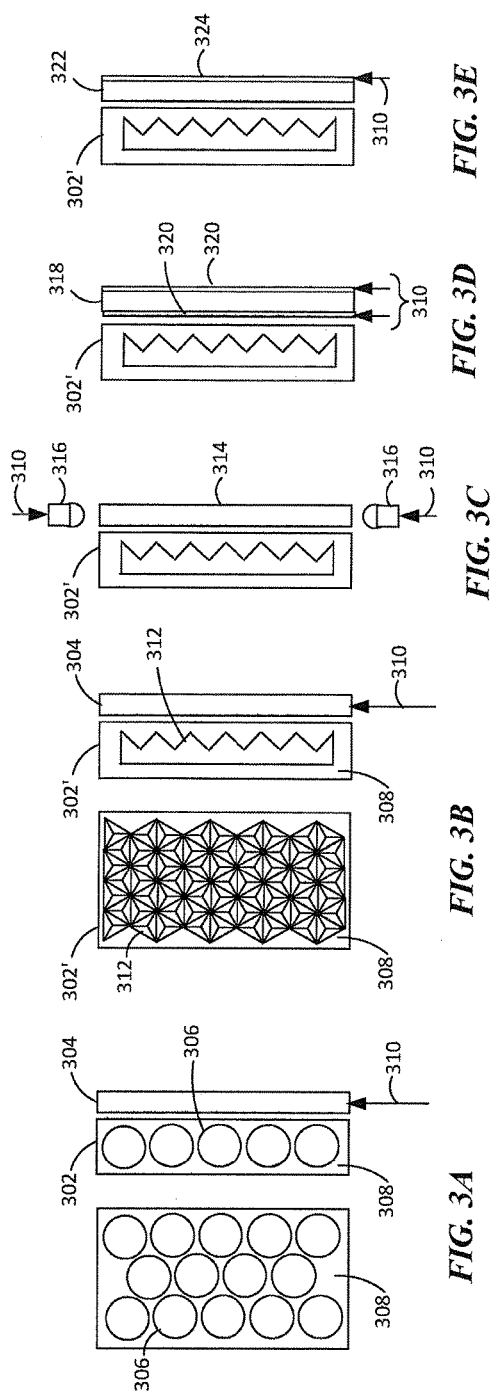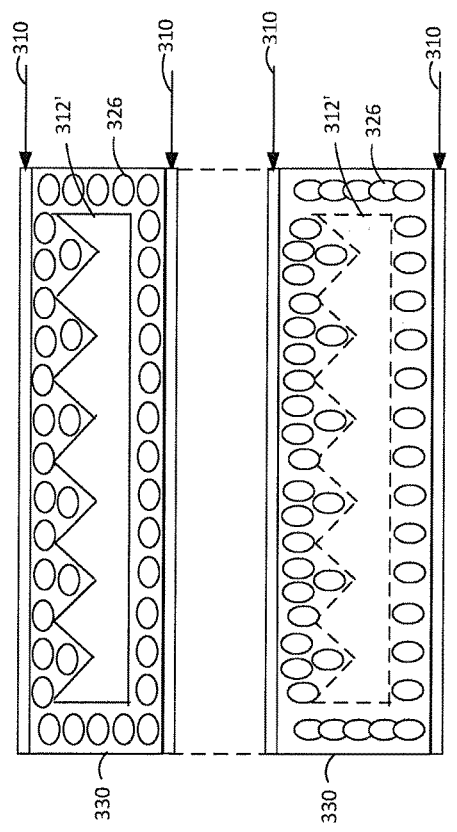

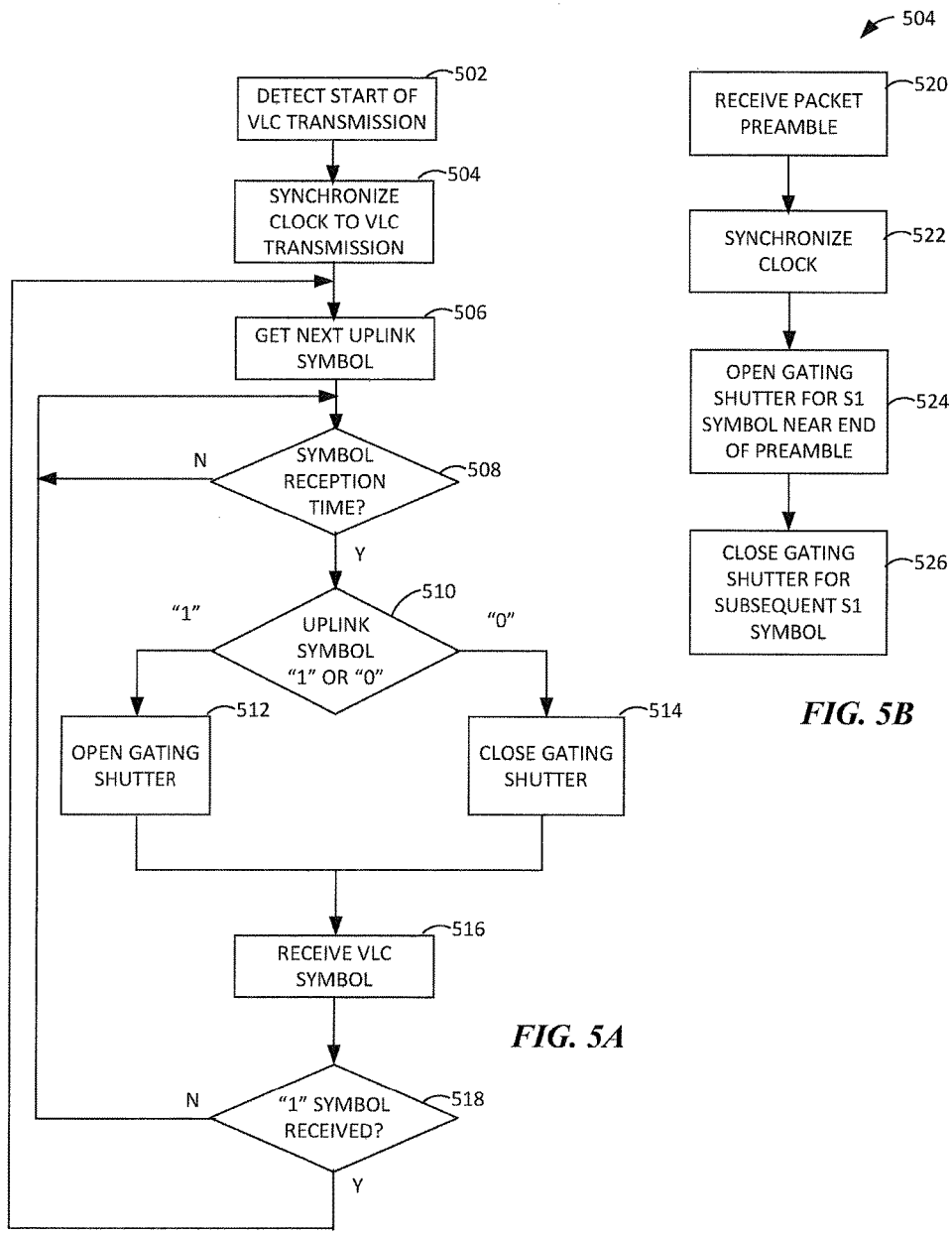

SYSTEM AND METHOD USING A GATED RETRO-REFLECTOR FOR VISIBLE LIGHT UPLINK COMMUNICATION

TECHNICAL FIELD

The present subject matter relates to techniques and equipment to provide a uplink communications in a visible light communication system.

BACKGROUND

Visible light communication (VLC) is gaining in popularity for transmission of information in indoor or outdoor locations, for example, from an artificial light source to a mobile device. The example VLC transmission may carry broadband user data, if the mobile device has an optical sensor or detector capable of receiving the high speed modulated light carrying the broadband data. In other examples, the light is modulated at a rate and in a manner detectable by a typical imaging device (e.g. a rolling shutter camera). This later type of VLC communication, for example, supports an estimation of position of the mobile device and/or provides some information about the location of the mobile device. These VLC communication technologies have involved modulation of artificially generated light, for example, by controlling the power applied to the artificial light source(s) within a luminaire to modulate the output of the artificial light source(s) and thus the light output from the luminaire.

VLC is typically used for down-link communication, from a server to a portable or wearable device. Uplink communication channels are usually established using short-range wireless transmitters, such as IEEE 802.11 Wi-Fi, IEEE 802.15 Zigbee or Bluetooth short-range radio transmitters or transceivers. These technologies, however, consume power in the portable or wearable device and, thus, reduce the lifetime of its battery.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2A is a block diagram partly in isometric form showing an example physical arrangement of a luminaire and a portable device using a gated retro-reflector to send uplink data in a VLC communication system.

FIGS. 2B and 2C show examples of gated retro-reflectors.

FIGS. 3A, 3B, 3C, 3D, 3E and 3F are side and front plan views of different example gated retro-reflectors.

FIGS. 5A and 5B are a flow-chart diagrams that are useful for explaining the operation of an example portable device that uses a gated retro-reflector to send uplink data in a VLC communication system.

DETAILED DESCRIPTION

Figure 1:
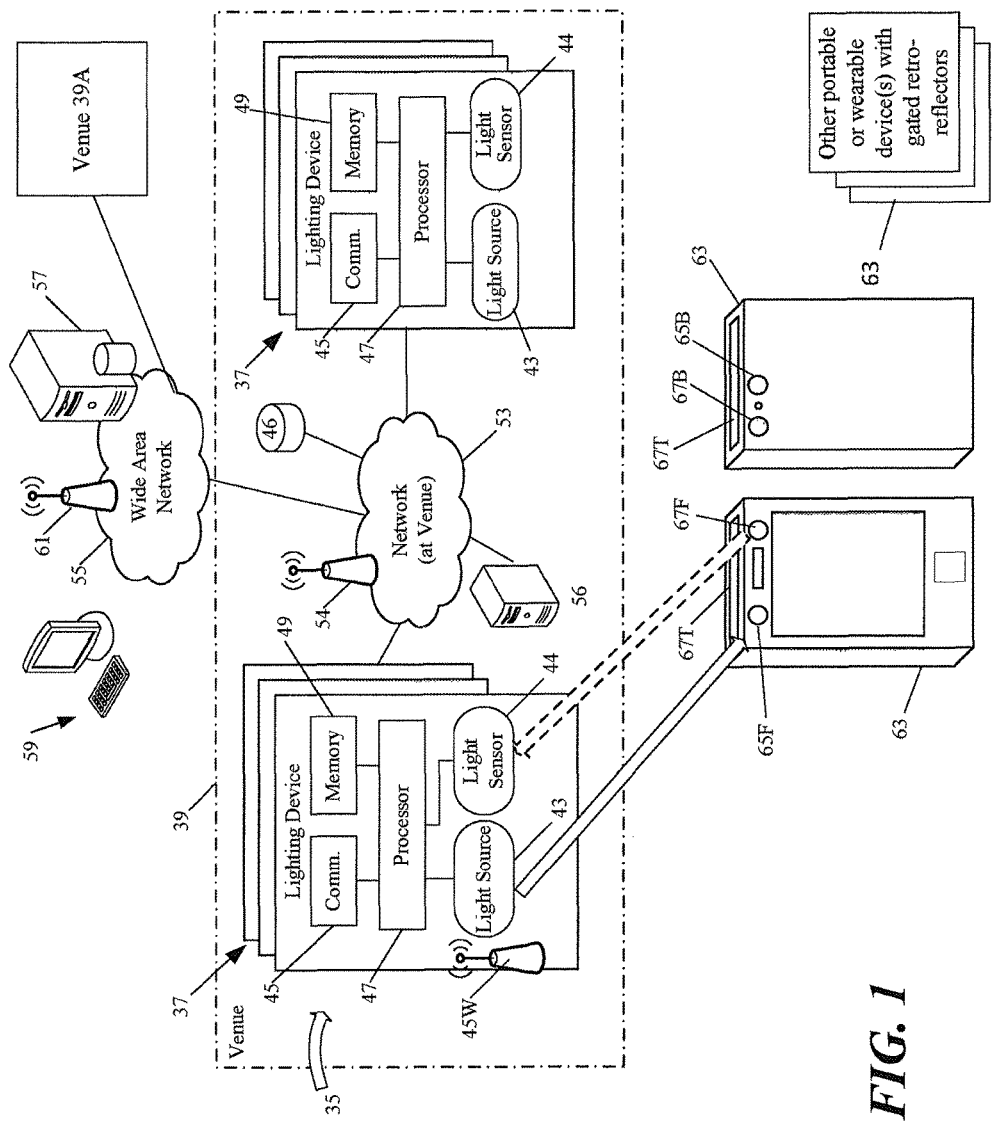
FIG. 1 is a block diagram, partly in isometric form, that shows a number of elements in block diagram of a VLC system and a portable device that uses a gated retro-reflector to send uplink data.

The technology examples disclosed herein provide devices, programming and methodologies for improved uplink communication in a VLC environment. As used in this application, uplink and upload are synonyms, as are download and downlink.

By way of an example, lighting related functions of a portable device involve processing data obtained from a communication network via a lighting device using a camera or other light sensor (e.g. photodiode, phototransistor, photoresistor or photomultiplier) associated with the portable device. It also may be desirable for the portable device to send uplink data to wirelessly communicate via the lighting device with a network that obtains data based on the data detected by the lighting device. The portable device sends the uplink data by selectively retro-reflecting the light pulses containing the VLC data that is transmitted to the portable device from the lighting device.

Although the examples below describe the transmission of uplink data in a VLC environment using a portable device, it is contemplated that the device may not be portable but may be in a fixed location or may be attached to or integral with a piece of equipment in the venue.

The device selectively reflects received VLC light pulses back toward the lighting device using a gated retro-reflector. Retro-reflectors are well known and are commonly used in many applications such as paint used for lane separations on highways and in bicycle reflectors. Two types of retro-reflectors are commonly used, spherical lenses and cube-corners, also known as trihedral prisms. Spherical lenses are spheres of a transparent material having an index of refraction greater than their surrounding material. Light entering the spherical lens tends to exit in the same direction at which it entered and, thus, is preferentially reflected back (retro-reflected) toward the light source from which it was emitted. Similarly, in a cube-corner retro-reflector, light incident upon one surface of the cube corner is reflected onto another surface and, from that surface back toward the light source that emitted the light. Retro-reflectors may be implemented as physical retro-reflecting structures or as a holographic optical element that is a hologram of a retro-reflecting structure. In the examples described below, the retro-reflector includes a gating shutter (also referred to herein as a gate) that, in one state, either blocks or absorbs light incident upon the shutter and in another state passes light through the shutter to and from the retro-reflector. The gating shutter may also be implemented as a holographic optical element. The operation of several example gated retro-reflectors is described in more detail below with reference to FIGS. 2A-2C and 3A-3F.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In several aspects, the examples discussed in the detailed description utilize or relate to a portable device, such as a mobile telephone. They may also relate to a user wearable device or a device that is imbedded in the body of a user, an animal or a plant. As used herein, the term "portable device" describes a device meant to broadly encompass any item of headgear, eyewear, clothing, implant or apparel or other accessory, such as a handset control device, a smartphone, an implanted identification device or the like that can be worn or carried by a user. Examples of portable devices include eyeglasses, hats, helmets and visors; ornamental apparel (e.g. headpieces, earrings, etc.); as well as earphones, earmuffs and headphones or headsets; or the like. Other examples of portable devices include bracelets, necklaces, head and arm bands, other accessories, such as a purse, articles of clothing or prosthetics with embedded or attached electronics. Example portable devices also include optical transceivers coupled to equipment in the venue that receives location requests or commands from the local server and sends location responses or command acknowledgements to the local server via VLC.

The examples of systems and methods described herein provide downlink information to the portable device and receive uplink information from the portable device. The information sent to and received from the example portable device includes lighting control commands, location data in an indoor or outdoor positioning system, catalog and order information in a retail environment, and data communication protocol data allowing a user to access data from a local server, a remote server or a global information network (e.g. the Internet) or other two-way communications. The system examples include a lighting device coupled to a local server that sends data to and receives data from one or more of the portable devices in one or more venues via VLC. Referring now to FIG. 1, which provides a block diagram of a number of elements of a system 35 of intelligent lighting devices 37 at one or more venues 39. Such a system 35 also may include separate standalone sensor units and/or some number of network connected user interface elements, e.g. configured as wall controllers or the like. For convenience, such sensors and user interface components of the system 35 have been omitted.

The illustrated example of the system 35 includes a number of intelligent lighting devices 37, such as fixtures or lamps or other types of luminaires. The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, an example lighting device 37 provides light for use by automated equipment, such as sensors/monitors, robots, etc. that occupy or observe the illuminated space, instead of or in addition to light provided for an organism. As another example, a lighting device emits light in a manner intended to simultaneously provide useful illumination of a space and transmission of data.

A lighting device 37, for example, may take the form of a lamp, light fixture or other luminaire that incorporates a light source, where the source by itself contains no intelligence or communication capability (e.g. LEDs or the like, or lamp ("regular light bulbs") of any suitable type). In most examples, the lighting device(s) 37 illuminate a service area to a level useful for a human in or passing through the space, e.g. regular illumination of a room or corridor in a building or of an outdoor space such as a street, sidewalk, parking lot or performance venue.

The drawing shows a system 35 having a relatively high degree of intelligence implemented in the lighting devices themselves as well as networked communications amongst the lighting devices. Hence, in the example, each respective intelligent lighting device 37 includes a light source 43, as well as a communication interface 45, and a processor 47 coupled to control the light source 43 and to receive signals from a light sensor 44 configured to receive the retro-reflected light from the portable device. The light sources 43 may be virtually any type of light source suitable to provide the intended type of light output that is electronically controlled. The light source 43, for example, provides visible or non-visible illumination or lighting or irradiation for other purposes (e.g. lighting for robot operation, UV cleansing, etc.); although for convenience, the description below refers to the principal light output as providing visible illumination for human occupancy or the like. The light sources 43 are of the same general type in all of the lighting devices 37, e.g. all formed by some number of light emitting diodes (LEDs); although in many installations, some numbers of the lighting devices 37 may have different types of light sources 43, e.g. some use organic light emitting diodes (OLEDs), LEDs, electroluminescent light sources incandescent filaments, compact or tube type fluorescent sources, etc.

The processor 47 also is coupled to communicate via the communication interface 45 and the network link with one or more others of the intelligent lighting devices 37 and is configured to control operations of at least the respective lighting device 37. The processor 47 may be implemented via hardwired logic circuitry, but in the examples, the processor 47 is a programmable processor such as the central processing unit (CPU) of a microcontroller or a microprocessor. Hence, in the example of FIG. 1, each lighting device 37 also includes a memory 49, storing programming for execution by the processor 47 and data that is available to be processed or has been processed by the processor 47. The processors and memories in the lighting devices may be substantially the same in various lighting devices 37 throughout the venue, or different devices 37 may have different processors 47 and/or different amounts of memory 49, depending on differences in intended or expected processing needs.

In the examples, the intelligence (e.g. processor 47 and memory 49) and the communications interface(s) 45 are shown as integrated with the other elements of the lighting device or attached to the fixture or other element that incorporates the light source. However, for some installations, the example light source is attached in such a way that there is some separation between the fixture or other element that incorporates the electronic components that provide the intelligence and communication capabilities. For example, the communication component(s) and possibly the processor and memory can be elements of a separate device or component coupled and/or collocated with the light source 43.

In our example, the system 35 is installed at a venue 39. The system 35 also includes a data communication network 53 that interconnects the links to/from the communication interfaces 45 of the lighting devices 37, so as to provide data communications amongst the intelligent lighting devices 37. The example data communication network 53 supports data communication by equipment at the venue 39 via wired (e.g. cable or fiber) media or via wireless (e.g. WiFi, Bluetooth, Zigbee, LiFi, IrDA, etc.) or combinations of wired and wireless technology. Such a data communication network 53 may also be configured to provide data communications for at least some of the intelligent lighting devices 37 and possibly other equipment at the venue via a data network 55 outside the venue, shown by way of example as a wide area network (WAN) 55, so as to allow devices 37 or other elements/equipment at the venue 39 to communicate with outside devices such as the server/host computer 57 and the user terminal device 59. The wide area network 55 outside the venue may be an intranet or the Internet, for example.

The lighting devices 37 are located to provide lighting service in various areas in or about the venue 39. Most of the examples described below focus on building installations for convenience, although the system 35 may be readily adapted to outdoor lighting. Hence, the example of system 35 provides lighting and possibly other services in a number of service areas in or associated with a building, such as various rooms, hallways, corridors or storage areas of a building and an outdoor area associated with a building. Any building at the venue 39, for example, may be an individual or multi-resident dwelling or may provide space for one or more enterprises and/or any combination of residential and enterprise facilities. For example, the venue 39 may be an office building with lighting devices 37 located in rooms within the office building, an area of a shopping mall, or may be an apartment building having a number of apartments that have lighting devices 37 located in the rooms of each apartment in the apartment building. Possible venues 39 are not limited to indoor spaces, but may also be outdoor spaces. For example, the lighting devices 37 may be located in stairwells of the apartment or office building. Alternatively, a number of lighting devices 37 may be located on street light poles to operate as "street lights" that illuminate a sidewalk or other area that pedestrians may travel through or may congregate. Lighting devices 37 may also be used in outdoor and garage type parking lot lighting applications. In general, the venue 39 may be any location or locations serviced for lighting and other purposes by a networked intelligent lighting system 35 of the type described herein.

A light sensor 44 is coupled to the processor 47 of the lighting device 37, and is configured to collect retro-reflected light pulses containing uplink data from one or more portable devices 63 in the venue. The types of sensors that may be included in the light sensor include infra-red sensors, ultraviolet sensors, visible light sensors, or wavelength selective sensors. The sensors may be individual photodiodes or collections of photodiodes or charge-coupled devices that form an imaging array, for example of a digital camera. The sensors 44 may also include other types of photosensors such as phototransistors, photoresistors and/or photomultipliers. Each lighting device 37 may include one or more light sensors 44.

The light sensor 44 provides data collected from sensed retro-reflected light pulses to the processor 47 of the lighting device 37. The processor 47 processes the data received from the lighting device 37 locally although, alternatively or in addition, it may send the received data to one or more servers coupled to the network 53 at the venue. Furthermore, the received data may be sent via the network 53 to the WAN 55 for processing by servers or other computers remote from the venue.

Because lighting devices 37 are often installed at ceiling level of a room, the field of view of the light sensor 44, in some examples is downward toward the floor of the room. For such installation examples, some of the portable device(s) 63 may not be located directly beneath the light sensor 44, and as a result, the light sensor may only detect a portion or a lateral view of a portable device 63. Consequently, it is desirable to include multiple gated retro-reflectors on each portable device, on respectively different sides of the device so that, if only a single side is visible to the light sensor 44 of the lighting device 37, the retro-reflector on that side may be used to send the uplink data to the lighting device. As shown in FIG. 1, the portable device 63 includes three gated retro-reflectors, 67F, 67T and 67B on the front, top and back surfaces, respectively, of the portable device 63.

When there are multiple lighting devices 37 in a room, and the multiple lighting devices are synchronized to send the same VLC data at the same times the data from multiple lighting devices 37 may be combined to recover the uplink data. Also, each of the lighting devices 37 may have multiple light sensors 44. As described below, it may be desirable to widen the beam from the gated retro-reflector 67. In this instance, the retro-reflected beam may be detected by more than one light sensor 44 on the lighting device 37 or by multiple lighting devices 37 where the lighting devices are synchronized. Thus, the data from each of the light sensors 44 from multiple lighting devices 37 may be combined to recover the uplink data.

Each example lighting device 37 receives uplink data from multiple portable devices 63. In order to distinguish signals from multiple devices, it is desirable for the light sensors 44 on the lighting devices 37 to be digital imaging devices that enable image processing that can spatially separate different sources of retro-reflected light. The use of an imaging device may also be useful for identifying the retro-reflected sources, because, as described in the example below, these sources may appear to flash on and off in synchronism with the VLC pulses emitted by the lighting devices 37. As an alternative to using an imaging light sensor 44, signals collected by multiple non-imaging light sensors 44 (e.g. photodiodes, phototransistors, photoresistors and/or photomultipliers) can be combined by addition or subtraction to isolate retro-reflected light from a single portable device 63.

In one implementation, the portable device 63 uses the gated retro-reflectors 67 to transmit uplink data in a visible light communication (VLC) system. The gated retro-reflector includes a retro-reflector receives light from a light source and preferentially reflects the received light back toward the light source. The portable device includes one or more light sensors that receives VLC data at regular intervals in which one or more light pulses or the absence of any light pulses during one of the intervals represents a VLC data value. A controller controls the gating shutter to send uplink data from the device responsive to each received VLC light pulse. The controller opens the gating shutter or leaves the gating shutter closed during the reception of a VLC light pulse to upload data symbols. The retro-reflected light pulses containing the uplink data are received by light sensors 44 of the lighting devices 37.

Each example lighting device processor 47 transmits, via communication interface 45, the collected light sensor 44 data set, either in real-time or in batch form, e.g. to the server 56. The server 56 processor(s) (not shown) executes programming code that correlates and combines the sensed uplink data based on the data received by one or more lighting devices 37 located in an area (i.e., room). Of course, the more sets of data received for a particular area, the better the signal-to-noise ratio (SNR) of the data will be.

The example lighting devices 37 as well as any other equipment of the system 35 or that uses the network 53 in the areas of the venue 39 connect together using the network links and any other media forming the communication network 53. For network communication operations, the lighting devices 37 (and other system elements if any) for a given area are coupled together for network communication with each other through data communication media to form a portion of a physical data communication network. Similar elements in other service areas of the venue may be coupled together for network communication with each other through data communication media to form one or more other portions of the physical data communication network at the venue 39. In the example, the communication interface 45 in all the lighting devices 37 in a particular service area are of the same type and are configured to operate in a manner that is compatible with the physical media and electrical protocol(s) implemented for the particular service area and/or throughout the venue 39. Although the communication interfaces 45 are shown communicating to/from the network cloud 53 via lines, such as wired links or optical fibers; some or all of the interfaces 45 may use wireless communications media such as optical or radio frequency wireless communication. Also, although the examples in FIG. 1 show most of the lighting devices 37 having one communication interface, some or all of the lighting devices 37 may have two or more communications interfaces employing different protocols to enable data communications over different media with the network(s) and/or with other devices in the vicinity.

The various portions of the network in different portions of the venue in turn are coupled together to form a data communication network at the venue, for example to form a venue-wide local area network (LAN) or the like. The overall venue network, generally represented by the cloud 53 in the drawing, encompasses the data links to/from individual lighting devices 37 and any networking interconnections within respective areas of the venue where the devices 37 are installed as well as the LAN or other venue-wide interconnection and associated switching or routing. In many installations, there may be one overall data communication network 53 at the venue 39. For larger venues and/or venues encompassing disparate physical locations, the venue-wide network 53 may be formed from separate but interconnected physical networks. The LAN or other data network forming the backbone of system network 53 at the venue 39 may be a data network installed for other data communications purposes of the occupants; or the LAN or other implementation of the network 53, may be a data network of a different type installed substantially for lighting system use and for use by only those other devices at the venue that are granted access by the lighting system elements (e.g. by the lighting devices 37).

Hence, there may be data communication links within a room or other area as well as data communication links to and from the lighting devices 37 in the various rooms or other areas out to wider network(s) forming the data communication network 53 or the like at the venue 39. Devices 37 within an area can communicate with each other, with devices 37 in different rooms or other areas, and via the WAN 55, with equipment such as 57 and 59 outside the venue 39.

Various network links within an area, amongst devices in different areas and/or to wider portions of the network 53 may utilize any convenient data communication media, such as power line wiring, separate wiring such as coax or Ethernet cable, optical fiber, free-space optical, or radio frequency wireless (e.g. Bluetooth, Zigbee or Wi-Fi); and a particular venue 39 may have an overall data network 53 that utilizes combinations of available networking technologies. Some or all of the network communication media may be used by or made available for communications of other gear, equipment or systems within the venue 39. For example, if combinations of WiFi and wired or fiber Ethernet are used for the lighting system communications, the WiFi and Ethernet may also support communications for various computer and/or user terminal devices that the occupant(s) may want to use in the venue. The data communications media may be installed at the time as part of installation of the lighting system 35 at the venue 39 or may already be present from an earlier data communication installation. Depending on the size of the network 53 and the number of devices and other equipment expected to use the network 53 over the service life of the network 53, the network 53 may also include one or more packet switches, routers, gateways, etc. (not shown).

Of note for purposes of the discussion of the portable or user wearable device 63 and other types of portable or user wearable devices, the system 35 of intelligent lighting devices 37 at the venue 39, particularly the network 53 of that system 35, can support wireless data communications with the devices 63. For example, the network 53 includes an appropriate wireless access point 54 compatible with the particular transceiver implemented in the devices 63 and other types of portable or user wearable devices that operate in the venue 39. For the portable devices 63, this data link may be used as an alternative to the VLC data link when a suitable VLC connection cannot be established or for communicating with portable devices (not shown) that do not have VLC capabilities and/or gated retro-reflectors.

An installed lighting device may provide the wireless network access for the portable devices 63. For example, intelligent implementations of the lighting device include communications capabilities. Those capabilities include a network communication interface, for example, to access a broader area network outside the venue. Some lighting device implementations may also include a wireless transceiver 45W (a component of the communications interface 45) for use by other devices within the venue. In this latter example, the lighting device itself provides access via the wireless transceiver for use by the portable device 63 if no suitable VLC uplink can be established or if the portable device is not equipped for VLC.

A host computer or server, such as server 57, can be any suitable network-connected computer, tablet, mobile device or the like programmed to implement desired network-side functionalities. Such a device may have any appropriate data communication interface to link to the public WAN 55. Alternatively or in addition, a host computer or server similar to 59 may be operated at the venue 39 and utilize the same networking media that implements data network 53.

The user terminal equipment such as that shown at 59 may be implemented with any suitable processing device that can communicate and offer a suitable user interface. The terminal 59, for example, is shown as a desktop computer with a wired link into the public WAN 55. However, other terminal types, such as laptop computers, notebook computers, netbook computers, tablet computers, and smartphones may serve as the user terminal computers. Also, although shown as communicating via a wired link from the public WAN 55, such a user terminal device may also or alternatively use wireless or optical media and such a device may be operated at the venue 39 and utilize the same networking media that implements data network 53.

For various reasons, the communications capabilities provided at the venue 39 also support communications of the lighting system elements with user terminal devices and/or computers 59 within the venue 39. The example user terminal devices and/or computers within the venue use communications interfaces and communications protocols of types compatible with the on-venue networking technology of the system 35. Thus, although the examples below relate to using VLC to communication between the network 53 and portable devices 63, it is contemplated that VLC may also be used to communicate with any user terminals or computers (e.g. server 56) in the venue. Such communication with a user terminal, for example, allows a person in one part of the venue 39 to communicate with a lighting device 37 in another area of the venue 39, to obtain data therefrom and/or to control lighting or other system operations in the other area.

FIGS. 2A-2C describe the operation of the gated retro-reflector 67. As shown in FIG. 2A, the basic principle of operation of the system is to broadcast a VLC light pulse from the one or more of the light sources 43 of the lighting device 37 to the portable device 63. This light pulse is not directed toward the portable device but, in this example, a portion of the light pulse is incident upon the front light sensor 67F of the device 63. A portion is also incident upon the top and front gated retro-reflectors 67T and 67F. This portion is selectively reflected back toward the lighting device 37 and is sensed by one or more of the light sensors 44. For the sake of simplicity, FIG. 2A shows light from only one of the light sources 43 being received and retro-reflected back toward the lighting device 37. Practically, however, light from all of the light sources 43 may be received by the portable device 63 and retro-reflected back toward the various light sensors 44 of the lighting device 37.

FIG. 2B shows details of a cube-corner gated retro-reflector. This device include three reflective surfaces that meet each other at right angles, in the same way that three faces of a cube meet at the corner of the cube. As illustrated by ray tracing, a light beam 220 incident on one side 210 of the cube corner, is reflected to another side 212 and, from the other side 212 back as the beam 220 in the same direction as the incident light. That is to say, the angle θ between the incident light beam 220 and the horizontal plane is the same as the angle θ of the reflected light beam 222. As shown in FIG. 2A, the gated retro-reflector 67 includes a gating shutter 214 positioned in front of the retro-reflecting front face of the retro-reflector and controlled by a gating signal 216 to selectively block the incident beam 220 from reaching the retro-reflector. Because no light is incident on the retro-reflector, no light is reflected.

As shown in FIGS. 2B and 2C, it may be desirable to use a modified retro-reflector that disperses the reflected light beams over a larger area than a true retro-reflector. A true retro-reflector, such as that shown in FIG. 2B, preferentially reflects light as a narrow beam back to the light source. Because the light sensors are displaced relative to the light sources, however, the reflected light may not be incident on the sensor. Using a dispersive retro-reflector makes it more likely that at least some of the retro-reflected light is incident upon one of the light sensors. A dispersive retro-reflector is formed by adjusting the faces of the reflecting surfaces 210' and 212' such that they meet each other at angles slightly greater or slightly less than 90 degrees. As shown in FIG. 2C, this results in the reflected light beam 222' having an angle φ with respect to the horizontal plane, where φ is less than θ. Thus, the reflected beam is dispersed relative to the beam that would be produced by a true retro-reflector. The angle at which the sides of the dispersive cube-corner retro-reflectors meet range from 70 degrees to 120 degrees, 80 to 100 degrees or 85 to 95 degrees.

It is contemplated, however, that other methods may be used to disperse the retro-reflected beam, for example by including a diffuser in the gated retro-reflector. The diffuser may be positioned between the retro-reflector 67 and the gating shutter 214, in the gating shutter 214 or between the gating shutter 214 and the sensor. It is also contemplated that the retro-reflector 67 may be textured to provide a diffused retro-reflected beam.

FIGS. 3A through 3F illustrate different types of gated retro-reflectors. As described above, two types of retro-reflectors are commonly used: those based on spherical lenses and those based on cube-corners or trihedral prisms. FIG. 3A shows front face of a spherical-lens retro-reflector 302 and a side-plan view of the retro-reflector with the gating shutter 304, positioned in front of the front face of the retro-reflector 302. As shown, the example retro-reflector 302 includes several closely packed spherical lenses 306. The lenses are contained in a transparent medium 308 which has an index of refraction less than that of the lenses. This medium may be air. The difference in the indexes of refraction between the lens 306 and the medium 308 causes light entering the spherical lens to be retro-reflected back in the same direction as the arriving light. In use, the gating shutter 304 is positioned between the front-face of the retro-reflector and the lighting device and is controlled by a control signal 310. When the shutter is closed, no light reaches the retro-reflector and no VLC pulses are retro-reflected back toward the lighting device(s). When the shutter is open, however, VLC pulses are retro-reflected back toward the lighting device(s).

Example gating shutters are described below with reference to FIGS. 3B-3E. Although these example shutters are shown as being used with cube-corner retro-reflectors, it is contemplated that each of these shutters may be used with other types of retro-reflectors, such as those based on spherical lenses.

FIG. 3B is similar to FIG. 3A except that the retro-reflector 302' uses cube-corner retro-reflector elements 312. FIG. 3B shows the front face of the cube-corner retro-reflector 302' as well as a side-plan view of the retro-reflector 302' and a gating shutter 304. As described above, some example retro-reflectors 312 have sides that meet at right angles while others have sides that meet at angles slightly greater than right angles in order to disperse the retro-reflected light. As with FIG. 3A, the retro-reflectors 312 are suspended in a medium 308 having an index of refraction less than the index of refraction of the retro-reflector material. Alternatively, the retro-reflectors 312 may have mirrored surfaces. It is contemplated that the mirrored surface may be on the front faces or the back faces of sides of the cube-corners 312.

The example gating shutter 304, shown in FIG. 3B is a liquid crystal shutter. The example liquid crystal shutter includes a polarizer on one face and an analyzer on the other face with a liquid crystal medium between the plates. The two interior faces of the plates are coated with a transparent conductor, for example Indium-tin oxide (ITO) or a transparent conductive polymer such as polyaniline. One of the transparent conductors is coupled to a source of reference potential (e.g. ground) while the other conductor is coupled to receive the control signal 310. The polarizer and analyzer may be arranged so that their axes are parallel or orthogonal. When the axes are parallel, the shutter transmits light when the control signal 310 is at or near the reference potential and blocks light when the control signal is different from the reference potential. Conversely, when the axes are orthogonal, the shutter blocks light when the control signal approximates the reference potential and transmits light when the control signal and the reference potential are different. Although the example liquid crystal shutter 310 in FIG. 3B is described as being a liquid crystal shutter, it is contemplated that it may be any of several devices that are collectively known as "smart glass," including electrochromic devices, photochromic devices, thermochromic devices, suspended particle devices, micro-blind devices and polymer dispersed liquid crystal devices.

FIG. 3C is the same as FIG. 3B except that the gating shutter 314 includes a saturable absorber or a reverse saturable absorber. The light absorbed (blocked) by a saturable absorber decreases with increasing light intensity. Conversely, the light absorbed by a reverse saturable absorber increases with increasing light intensity. Saturable absorption and reverse saturable absorption materials are commonly used in lasers. Example dyes suitable for use as saturable absorption dyes or reverse saturable absorption dyes include polymethine dyes, as described in an article by O. Przhonlka et al. entitled "Nonlinear light absorption of polymethine dyes in liquid and solid media" J. Opt. Soc. Am. (1998) which is incorporated herein by reference.

The control input to the gating shutter 314, shown in FIG. 3C, is a light signal which, in the example shown in FIG. 3C is provided by light sources 316. Example light sources include superluminescent LEDs also known as SLEDs. When the gating shutter includes a saturable absorber, the devices 316 are turned on to saturate the absorber so that the shutter 314 passes light. When the gating shutter includes a reverse saturable absorber, the devices 316 are turned off to open the gating shutter. The light sources 316 may be arranged on one side, two sides or all four sides of the gating shutter 314.

The response of a saturable absorber is often limited to a specific band of wavelengths. Thus, it may be desirable for the light sensors 44 of the system 35 to include a band-pass filter (BPF) to preferentially detect light in the band of wavelengths passed by the absorber. This characteristic of the absorber has advantages as a method for screening out light from ambient light sources and, thus improve the signal-to-noise ratio relative to a broadband detector. Because both saturable and reverse saturable absorber devices are light sensitive, it is desirable to select the materials used to make the devices so that they are triggered by the light sources 316. That is to say, the materials should be selected so that they are not triggered by the light fluence in the venue. The materials may be selected, however, so that the ambient light fluence contributes to the saturation/desaturation of the materials, reducing the amount of light from the sources 316 used to switch the gating shutter.

FIG. 3D shows a gating shutter that includes a photonic crystal element 318. Photonic crystals are diffractive optical elements that include regularly spaced features having a different index of refraction from the body of the optical element. These features may be apertures in the body of the optical element. Alternatively, they may be relatively small spherical or cylindrical areas in which the medium of the optical element has been modified, perhaps by heat treatment, to have a different index of refraction than other areas of the medium. The spacing of the features in the body of the optical element are on the order of the wavelength of light incident on the photonic crystal. The differences in indexes of refraction generate interference patterns in optical signals passing through the elements. One type of photonic crystal implements a stopband filter that blocks light in a particular band of wavelengths. The example photonic crystal includes a defect in its structure that implements a passband filter within the blocked band of wavelengths. A photonic crystal of this type is described in U.S. Pat. No. 6,947,649 entitled METHOD OF ADJUSTING THE INDEX OF REFRACTION OF PHOTONIC CRYSTALS WITH LASER MICROMACHINING TO TUNE TRANSMISSIONS WITHIN THE BANDGAP AND STRUCTURE to M. Li et al. which is incorporated herein by reference.

The spacing of the features in the photonic crystal determines both the stopband and the passband within the stopband. Changing the size of the photonic crystal causes the distance between the features to change and thus, causes the wavelength ranges of both the stopband and the passband to change. In FIG. 3D, the example photonic crystal 318 is formed from a transparent piezoelectric material such as quartz. The control signal is provided by transparent electrodes 320 positioned on either face of the photonic crystal 318. A voltage applied to these electrodes causes the crystal to expand or contract, changing the stopband and/or passband of the photonic crystal. The changes in the stopband and passband are be relatively small. Thus, the example gating shutter shown in FIG. 3D selectively switches the passage of a narrow-band optical signal, either in the defined passband or near the edge of the stopband.

The example gated retro-reflector shown in FIG. 3E also employs a photonic crystal device 322 formed from a material that expands when heated. The gating shutter uses a heater 324 to selectively cause the photonic crystal to expand or contract in order to open or close the shutter. This heating device may be a resistive element formed from thin resistive wires or from a transparent conductor. The control signal 310 in this instance provides current to or removes current from the heater 324 causing the photonic crystal 322 to either expand or contract. This expansion and contraction has the same effect as the piezoelectric expansion and contraction described above with reference to FIG. 3D.

FIG. 3F illustrates a gated retro-reflector in which the retro-reflective properties are controlled by controlling the index of refraction of a material surrounding the retro-reflector 312'. Some liquid crystal materials have different indexes of refraction in their aligned and unaligned states. In one implementation, the retro-reflector 312' is formed from a holographic polymer dispersed liquid crystal (HPDLC) medium. This retro-reflector may be a holographic optical element formed by exposing the HPDLC medium to a reference beam and to an object beam formed by light from the source of the reference beam reflected by a retro-reflector such as a spherical retro-reflector or a cube-corner retro-reflector. In another example, the retro-reflector 312' is suspended in a liquid crystal medium within a housing 330. In this implementation, the retro-reflector 312' is formed from a polymer material, similar to the polymer material used in the HPDLC device. This material has an index of refraction that is substantially the same as the index of refraction of the liquid crystal material in its unaligned state and that is substantially different from the index of refraction of the liquid crystal material in its aligned state. It is contemplated, however, that a material may be selected that has a different index of refraction than the liquid crystal material in its unaligned state and substantially the same index of refraction when the material is in its aligned state. In one example, the pre-polymer material in the HDPLC medium is a photo-curable monomer, that, with application of light, is converted into an acrylated urethane. The retro-reflector 330 shown in FIG. 3F also has a housing formed from an index matched material, such as poly-methyl-methacrylate (PMMA) and an index-matched conductive coating, such as Baytron-P conducting polymer on the interior of the top and bottom elements of the housing. More information on working with HPDLC materials may be found in U.S. pub. no. 2010/0231997 to Fontecchio et al. which describes the implementation of a holographic Bragg grating reflector. This patent publication is incorporated herein by reference.

Although the example shown in FIG. 3F employs cube-corner retro-reflectors, it is contemplated that it may be implemented with spherical lens retro-reflectors or other types of retro-reflectors that may be formed in an HDPLC medium.

As described above, the retro-reflectors shown in FIGS. 3C and 3D that operate only in a limited wavelength band may be advantageous because they have a better signal-to-noise ratio than broad-band devices which may be subject to ambient interfering light. One way to limit the wavelength band is to employ optical filters at the emitter, retro-reflector and/or the sensor. In one implementation, the emitter is a broad-band light source and both the gated retro-reflector and the sensor have optical filters that limit the wavelength band of the retro-reflected and detected signal. The filter in the gated retro-reflector may be between the retro-reflector and the gate, between the gate and the sensor or part of the gate, as described above with reference to FIGS. 3C and 3D. Furthermore, the retro-reflector may be formed from a material that preferentially reflects light in one or more particular wavelength bands while passing light in other bands. For example, silicon reflects visible light but is transparent to IR light.

It is also contemplated that a device may have multiple gated retro-reflectors, each having a different optical filter and, thus, operating in a different wavelength band. This may be beneficial to increase the bandwidth of the uplink signal or to transmit multiple uplink signals. For example, a mobile device may have a first gated retro-reflector operating in the 730-740 μm IR band and a second filter operating in the 760-770 μm IR band. In these implementations, the lighting devices 37 may include multiple emitters that also emit different light signals and multiple sensors having optical filters that selectively sense the respective wavelength bands. Alternatively, the lighting device 37 may have a single broad-band source and multiple sensors, each with its respective optical filter.

It may be helpful at this point to consider an example of the electronics of a portable device, in somewhat more detail. For that purpose, FIG. 4 includes a high-level functional block diagram of a portable device, in this example, of the portable device 63 shown in FIG. 1.

Figure 4:
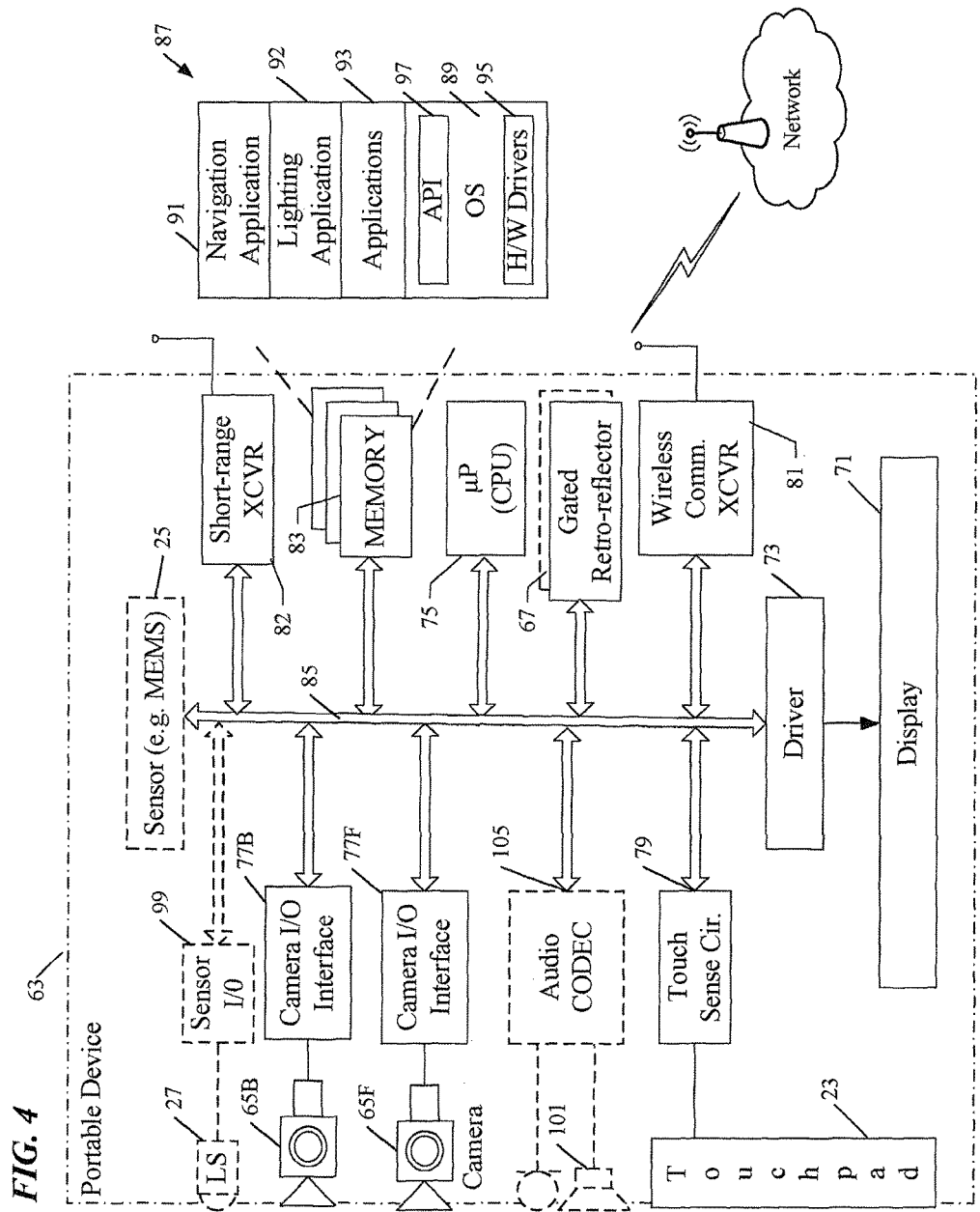
FIG. 4 is a high-level functional block diagram of an example of a portable device, configured to send uplink data in a VLC system using a gated retro-reflector.

As described earlier, the example of the user portable device 63 includes one or more gated retro-reflectors shown generically at 67 in FIG. 4. The dashed lines proximate to the gated retro-reflector 67 indicate the possibility of multiple gated retro reflectors 67. The example gated retro-reflectors 67 may be any of the combinations of retro-reflectors and gating shutters described above with reference to FIGS. 3A through 3F. The gated retro-reflector 67 is coupled to a bus 85 to be controlled by the processor 75. As described above, the processor 75 generates control signals 310 to control the gating shutters, as described with reference to FIGS. 3A through 3E or to control the retro-reflector itself, as described with reference to FIG. 3F. The processor is coupled to one or more digital to analog converters (DACs) (not shown) and/or to driver circuits (not shown) to produce the control signals described with reference to FIGS. 3A through 3F.

The example gated retro-reflectors 67 are of the same type and are coupled in parallel to receive a common control signal. Alternatively, they may each receive a distinct control signal. As another alternative, the gated retro-reflectors 67 may be different types of gating shutters, each of which receives a different type of control signal. As shown in FIG. 1, it is contemplated that the gated retro-reflector 67 may be mounted on any or all of the front, back, top, sides or bottom of the portable device 63. It is also contemplated that the retro-reflector(s) 67 may be separate from the portable device, for example, worn on a user's shoulder, and coupled to the portable device 63 by a wired or wireless connection.

The portable device 63 also includes a display 71 and a display driver 73 for providing signals to operate the display 71. The driver 73 controls information output via the display 71, in response to instructions and data from other elements of the device 63, e.g. from the processor shown at 75.

Although other optical input devices may be provided instead of or in addition, the portable device 63 in the example includes a front camera 65F and a back camera 65B. The electronics of the portable device 63 in the example also include a respective camera input output (I/O) interface circuits 77F and 77B. The camera I/O circuits 77F and 77B provide control of the camera operations in response to control instructions from the processor 75 and to process signals from the cameras 65F and 65B for appropriate communications within the device 63 to other elements. The signal processing of the I/O circuits 77F and 77B could provide an analog or digital interface to the cameras 65F and 65B, depending on the particular type of cameras used, although the internal communications of still images or video captured via the cameras will likely use a standardized format. Depending on the technology and/or manufacturer, the camera and I/O circuit may be combined in a single integral component of the portable device 63.

The portable device 63 in the examples includes a user input device such as a touchpad 23. Touchpad 23, for example, may be a capacitive or other type of touch sensor similar to touchpads commonly used today on smart phones or user terminal type computer devices. Instead of or in addition to the touchpad 23, the user input may include one or some small number of finger-operable buttons or switches (e.g. mounted along or on one side of the portable device 63).

For the touchpad 23 type of user input, the portable device 63 also includes a touch/position sense circuit 79. If signals are required to operate the touch pad, the circuit 79 supplies these signals. The circuit 79 then senses signals from elements of the touchpad 23 and detects occurrence and position of each touch of the pad 23. The sense circuit 79 provides touch position information to the processor 75, which can correlate that information to state(s) of the device 63 and/or to any relevant information currently displayed via the display 71, to determine the nature of user input via the touchpad 23. Depending on the touchpad technology and/or manufacturer, the touchpad 23 and touch sensing circuit 79 may be a single integral component of the device 63.

The example portable device 63 also includes a communications transceiver (XCVR) 81 that supports cellular wireless electronic data communications (e.g. GSM, 3G, 4G) for the portable device 63. The transceiver 81 provides two-way wireless communication of information, for example applications specific information, in accordance with the applicable wireless technology standard and higher level communication protocols. The transceiver 81 also sends and receives a variety of signaling in support of the various communications for the user portable device 63.

A short-range transceiver 81 may implement low-power communications operations. Due to size constraints, the transceiver may be operate according to one or more of a number of short-range protocols, for example, Bluetooth, near-field communication (NFC), Zigbee, LiFi, IrDA, etc. If the portable device 63 uses Wi-Fi communication, the wireless link connects to an access point of the applicable data network, as shown above in FIG. 1. If the portable device 63 uses lower power data communication technology, the range of the wireless link may be relatively short. In such a case, the wireless link is with another communication device, such as a smartphone, configured to act as a hotspot access point transceiver, where the other communication device itself has access to a data network.

As noted, the portable device 63 includes a processor 75 that controls device operations as well as one or more memories 83. The one or more memory devices 83 of the user portable device 63 store programming for execution by the processor and data that is available to be processed or has been processed by the processor. For such purposes, the device 63 may use flash memory and/or other miniature memory devices.

Any of the various portable devices 63 may be implemented using a PC like approach based on any known or available microprocessor architecture, such as a Reduced Instruction Set Computing (RISC) using an ARM architecture, as commonly used today in mobile devices and other portable electronic devices, or a microprocessor architecture more commonly used in computers such as an instruction set architecture (ISA), like those used in Intel microprocessors and the like. The example of FIG. 4 shows the processor in the form of a microprocessor (µP) implementing a central processing unit (CPU) function. The processor 75 is coupled to the one or more memories 83, the gated retro-reflector(s) 67, the display 71, the cameras 65F and 65B, the transceiver 81 and the touchpad input device 23. Although other arrangements can be used, the example shows communications amongst such device elements via a bus network 85. The microprocessor based approaches are discussed by way of examples, with respect to FIG. 4; however, other processor implementations can be used, such as based on a Peripheral Interface Controller (PIC) or other microcontroller architecture.

The memories 83, for example, include read only memory (ROM), non-volatile random access memory (NV-RAM), and flash memory. The RAM in such an example serves as a working memory for loading instructions for execution and for holding data during data processing. The processor 75 is configured to control operations of the portable device 63 and has access to the programming in the memory devices 83. The memories 83 store programming 87 such as a boot routine (not shown), an operating system 89, application programs, 91, 93 as well as configuration data or settings. Of course, other storage devices or configurations may be added to or substituted for those discussed in this example.

The operating system 89 includes or works through hardware (H/W) device driver software 95 to enable the processor 75 to communicate with and control the other elements of the device 63. The operating system also implements one or more application program interfaces (APIs) 97. The API allows application layer programming to operate on the device through the operating system 89 to utilize various features, functions and physical components of the device 63. The API provides a published interface standard to allow applications written in conformance with that standard to execute on the processor 75 and operate via the operating system 89.

The portable device 63 has and runs an appropriate number of applications, including one or more lighting related applications. To illustrate the point, the drawing shows the programming 87 including a navigation application 91, a lighting application 92 as well as some number of other applications 93 for other purposes or services of the portable device 63. In addition to normal operations of the portable device, the programming for the processor configures the portable device to perform lighting related operations.

In support of several examples of methods of device operation outlined above, the lighting application 92 configures the portable device 63 for specific functions relating to a lighting device or system observable by the user of the portable device, some of which utilize input and/or output via the GUI of the device 63. The navigation related functions, for example, may include, receiving a location code via VLC from one or more light fixtures and using the received codes to determine the location of the portable device 63. Once the location is determined, the display 71 requests a map using data sent via the gated retro-reflector(s) 67, receive the map via VLC and display the determined location on the map. The example application also allows a user to identify a desired destination location on the map and request directions, using signals transmitted via the gated retro-reflector 67, to the desired destination.

The portable device 63 includes one or more additional sensors, represented by way of example by the sensors 25 and 27. The sensor 25 represents one or more devices that may be included in the portable device 63 to sense orientation and/or movement of the device. This information is used to determine which of the gated retro-reflectors, 67F, 67T, 67B, etc. is best situated to send uplink data back toward the lighting device that sent the VLC data. By way of an example, the sensor 25 may be or include micro-scale components such as an accelerometer, a gyroscope and/or a field strength and direction sensing magnetometer, for example, implemented using Micro-Electromechanical Systems (MEMS) similar to devices used in smartphones or the like to detect direction (e.g. compass heading), orientation (e.g. elevation angle), motion and/or acceleration.

If provided, the additional light sensor 27 may include one or more light intensity sensors (e.g. one or more photodiodes, phototransistors, photoresistors and/or photomultipliers) that are used instead of or in addition to the cameras 65F and 65B to detect the VLC signals. To support communication of information from the sensor 27 and the other system device elements, e.g. the processor 75, the memories 83 and/or transceiver 81, the portable device 63 includes a sensor input/output circuit 99. Such a circuit 99, for example, processes signals from the particular sensor(s) 27 for communication in the appropriate digital format over the bus network 85. Although shown separately, depending on the technology and/or manufacturer, a particular optical sensor 27 and its associated the sensor I/O circuit 99 may be an integral unit configured to have a standard interface connection to the bus 85 or other media used in the portable device 63.

In addition to the elements described above, the portable device 63 may include a number of still further elements. For example, if the device 63 is implemented in a mobile phone, intended to support audio, the device may include a speaker 101 and/or a microphone 103. A speaker 101 provides an audio signal output. The example portable device 63 includes a microphone 103 that provides an audio signal input. If provided, the speaker 101 and microphone 103 connect to voice coding and decoding circuitry (Audio codec) 105. The speaker and/or microphone provide additional user output/input elements for the user interface functions. For example, the device may be configured to sense spoken commands via the microphone 103 and to provide an audio output of lighting-related information for the lighting application 92 via the speaker 101. In addition, the speaker 101 may be used for audio navigational commands from the navigation application 91 may be generated such as "turn left," "turn right," "move to your right," "stop," and the like.

FIGS. 5A and 5B are flow-chart diagrams of an example method for operating the gating shutter(s) 67 to uplink data from the mobile device to one or more of the lighting devices 37. FIG. 5A is described with reference to the waveform diagrams shown in FIGS. 6A and 6B. VLC transmissions operate according to a predetermined protocol. An example protocol transmits frames of data from the lighting device 37 to the portable device 63. As described below, the portable device 63 uses one or more gating shutters 67 to upload data to the lighting device 37 while it receives downloaded VLC data from the lighting device.

An example frame includes a preamble, a header, payload data and a stop code. In one example, the VLC data may be send as a simple binary code. In this example, the VLC data is sent in regular intervals (VLC intervals). For example, a light pulse in one VLC interval represents a "1" bit and the lack of a light pulse in another VLC interval represents a "0" bit. It is contemplated, however, that a light pulse in the interval may represent a "0" bit and the lack of a light pulse may represent a "1" bit. It is further contemplated that a more complex modulation scheme may be employed in which multiple pulses are sent during each VLC interval or in which the width or position of one or more pulses in the VLC interval represents a data symbol so that a multi-bit data symbol is sent during each VLC interval. Thus, as described below, a symbol may represent a single bit or multiple bits.

For example, a VLC downloaded symbol may include zero, one or two light pulses in an interval. The VLC symbol, thus may have four values as shown in Table 1, where a "1" indicates presence of a light pulse and a "0" represents absence of a light pulse.

TABLE 1

| Light pulse 1 | Light pulse 2 | Value |
|---|---|---|
| 0 | 0 | 0 |
| 0 | 1 | 1 |
| 1 | 0 | 2 |
| 1 | 1 | 3 |

The uploaded symbol may selectively retro-reflect the entire downloaded symbol to provide a binary "1" when the entire symbol is retro-reflected (gating shutter open) and a binary "0" when the entire symbol is not retro-reflected (gating shutter closed). Alternatively, the portable device may divide each received light pulse into two or more sub-intervals and upload symbols using a code similar to that shown in Table 1. The encoding shown in Table 1 is only one example. It is contemplated that a symbol may be encoded as the presence or absence a single light pulse occupying all or a portion of the interval, implementing a pulse-position or pulse-width modulated signal or it may be multiple light pulses each occupying a respective sub-interval of the VLC interval, implementing a code-division modulated signal.

One example frame preamble includes a sequence of alternating symbols, S1 and S2, for example, "S1,S2,S1,S2, S1,S2,S1,S2,S1,S2" At block 502 the mobile device 63 detects alternating S1 and S2 symbols at the VLC transmission frequency to detect the start of the VLC transmission. At the same time, the mobile device 63, at block 504 (shown in more detail in FIG. 5B) uses the received preamble symbols to synchronize its clock.

In the example shown in FIG. 5B, the portable device 63 receives the packet preamble at block 520 and synchronizes its clock in block 522. Synchronization is achieved for example, by adjusting an internal clock circuit (not shown) that generates a clock signal for the portable device 63 so that transitions of the clock signal occur substantially concurrently with transitions of the preamble. This synchronization may be achieved using a phase-lock loop (PLL) (not shown). In one example, the internal clock signal may be synchronized before the end of the preamble, for example, when the $6^{th}$ symbol of the 10 symbol preamble has been received. The portable device 63, at block 524, opens the gating shutter when the $7^{th}$ symbol of the preamble is received and closes the gating shutter, at block 526, when the $9^{th}$ symbol of the preamble is received. The camera or other light sensor of the lighting device compares the light received during the $7^{th}$, $8^{th}$, $9^{th}$ and $10^{th}$ VLC intervals first, to compare the light received during the $7^{th}$ and $9^{th}$ VLC intervals to that received during the $8^{th}$ and $10^{th}$ VLC intervals to determine whether one or more retro-reflected signals may have been transmitted and, if the light sensors 44 are imaging devices, to determine locations for each of the possible retro-reflected signals. Second, the processor 47 of the lighting device 37 compares the light received during the $7^{th}$ and $9^{th}$ VLC intervals to the transmitted symbol S1. This comparison allows the processor 47 to calibrate the signals received from the light sensor 44 to the VLC symbols transmitted by the light source 43. In this example, the difference between the signals received during the $7^{th}$ and $9^{th}$ VLC intervals is the difference between an uploaded S1 symbol (gating shutter open) and no uploaded S1 symbol (gating shutter closed).

While this example uses the last four symbols of the preamble to calibrate the lighting devices 37, it is contemplated that the VLC protocol may employ a longer preamble, allowing the lighting device to calibrate differences between or among symbol values with the gating shutter open and closed over a larger number of VLC intervals. Alternatively, the system may use symbols other than the preamble symbols to perform the calibration, for example, successive symbols in the frame header. The gated retro-reflector transmits an uploaded symbol at the same time that a VLC symbol including a light pulse is received from the lighting source 37. No uploaded data is sent when no light pulses are received during a VLC interval. When the gating shutter is open during the reception of a VLC light pulse, that light pulse is reflected back toward the lighting device 37. When the gating shutter is closed during the reception of the light pulse, there is no retro-reflection. The processor 47 of the lighting device 37 interprets the retro-reflected light pulses as uploaded data symbols. An example implementation of the upload operation is described with reference to blocks 514 through 518. In this example, each VLC symbol includes one or more light pulses during one of the VLC intervals or no light pulses during the VLC interval.

For the sake of simplicity, in the example below, both the downloaded and uploaded VLC symbols are binary bits constituting the presence (a "1" bit e.g. S1=1) or absence (a "0" bit e.g. S2=0) of a single VLC light pulse in a VLC interval. Once the clock is synchronized at block 504, the mobile device 63 retrieves the next symbol to be uploaded to the lighting device 37. At block 508, the portable device waits until the next VLC symbol is to be received from the lighting device 37 (i.e. the start of the next VLC interval). Before the next VLC interval, the portable device 63, at step 510, determines whether the next symbol to be uploaded is a "1" or a "0". If it is a "1" then, at block 512, the portable device 63 opens the gating shutter, exposing the retro-reflector. Otherwise, at block 524, it closes the gating shutter. At block 516, the portable device receives the downloaded VLC symbol. At block 518, the portable device 63 determines whether the downloaded VLC symbol was a "1". If a "1" symbol was received then the uploaded symbol has been transmitted and control transfers to block 506 to get the next symbol to be uploaded from the portable device 63 to the lighting device 37. If, however, at block 518, the received downloaded VLC symbol was a "0", the upload symbol was not uploaded, since upload can only occur when a "1" symbol (light pulse) is received. When the received symbol is a "0" (no light pulse), control transfers to block 508 to await the VLC interval.

Figure 6A:
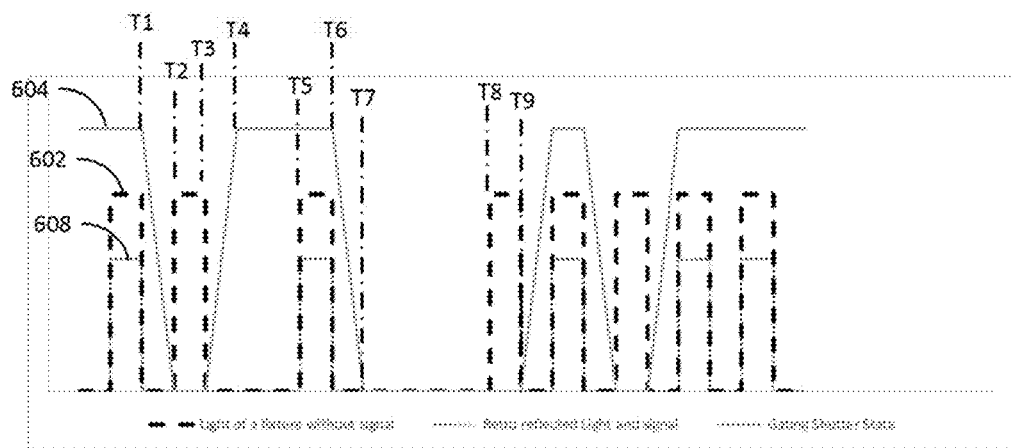
FIGS. 6A and 6B are waveform diagrams that are useful for describing the operation of example portable devices that use gated retro-reflectors to send uplink data in a VLC communication system.
Figure 6B:
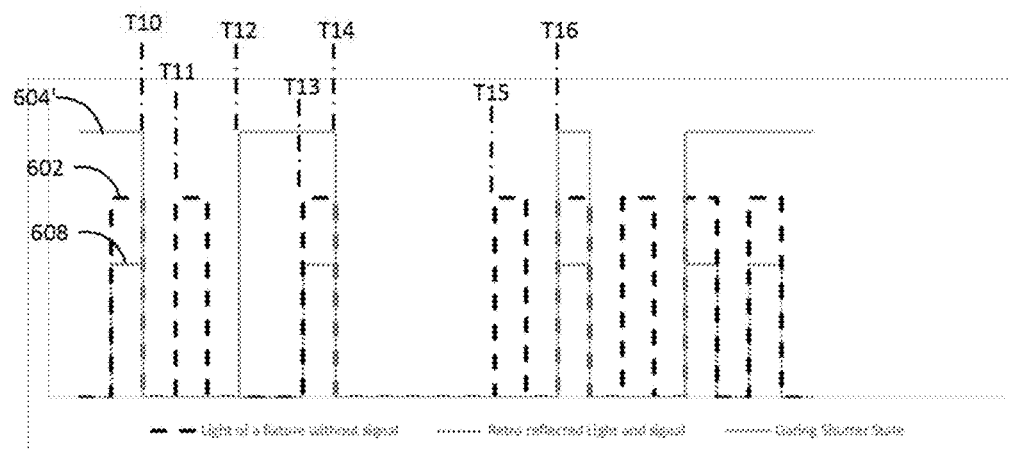

An upload operation using this simple binary symbols is shown in FIGS. 6A and 6B, for gating shutters that respectively switch slowly and quickly relative to the symbol transition time of the VLC data. In these FIGS., signal 602 is the received VLC data. Signal 604 is the control signal for the gating shutter and signal 608 is the upload symbol transmitted by retro-reflection.

As shown in FIG. 6A, at time T1, the portable device 63 determines that a VLC symbol (e.g. a single binary bit) will be received at a time T2, the start of a VLC interval, where the transition time of the gating shutter is T2-T1. At time T1, the portable device 63 causes signal 604 that controls one or more of the gating shutters to begin the transition. By time T2, the transition is complete. At time T2, when the "1" VLC bit is received, the gating shutter is closed and no light is retro-reflected back toward the light sensor 44 of the lighting device 37 (shown in FIG. 1). As described above, the lighting device interprets this as the uploading of a "0" symbol. At time T3, the signal 604 opens the gating shutter to upload a "1" symbol. At time T4, when the gating shutter is open, however, the received VLC symbol is "0" so the gating shutter remains open. Between times T5 and T6 the portable device receives a "1" VLC symbol which is retro-reflected to upload a "1" symbol to the lighting device 37. At T6, the portable device closes the gating shutter to upload a "0" symbol. At T7, the gating shutter is closed and remains closed until after a "1" VLC symbol has been received, in the VLC interval between times T8 and T9.

FIG. 6B shows the same sequence being uploaded by a portable device having a faster gating shutter. The signal 604' transitions to "0" at time T10, substantially coincident with the transition of the VLC pulse 602 to upload a "0" symbol. Assuming that the clock signal of the portable device 63 is synchronized with the clock pulse of the lighting device 37, these transitions may aligned to within plus or minus one-quarter of the pulse time of the VLC signal. It is contemplated, however, that if multi-bit symbols are downloaded and uploaded, it may be desirable to have more accurate synchronization between the clock signals of the portable device 63 and the lighting device 37. At time T11, the start time of the next VLC symbol, signal 604' remains low, keeping the gating shutter closed to upload a "0" bit to the light sensor 44. At time T12 the signal 604' transitions to high to upload a "1" symbol. A "1" valued VLC symbol, however, is not received until time T13. Thus, signal 604' remains high until time T14, after the "1" valued VLC symbol has been received and retro-reflected back toward the light sensor 44. At T14, signal 604' transitions low to upload a "0" symbol to the light sensor 44. This symbol is not uploaded, however, until T15, when the next "1" valued VLC symbol is received.

Although the embodiments described above use binary (on or off) bit values, it is contemplated that each retro-reflected pulse may be further modulated to change the amplitude of the pulse, allowing a symbol having multiple bits to be transmitted in a single pulse. This implementation may use additional calibration so that light levels representing different symbol values are uploaded by the gated retro-reflector at predetermined times during the calibration interval to allow the processor 47 of the lighting device to processed the respective light levels sensed by the light sensor 44. It is contemplated that the respective amplitudes of the retro-reflected pulses would be sufficiently different to allow the sensor 44 and processor 47 to distinguish the different received light levels. It is also contemplated that this pulse amplitude modulation may be combined with the pulse position modulation described above to further increase the number of bits in each symbol transmitted during a received data pulse.

Furthermore, although the described embodiments retro-reflect data back toward the light sensor 44 only when a received "1" VLC symbol is received, it is contemplated that the signal transmitted by the lighting device 37 may be a continuous wave (CW) signal having no pulses or regularly spaced pulses which are modulated to upload data, as described above.

Figure 8:
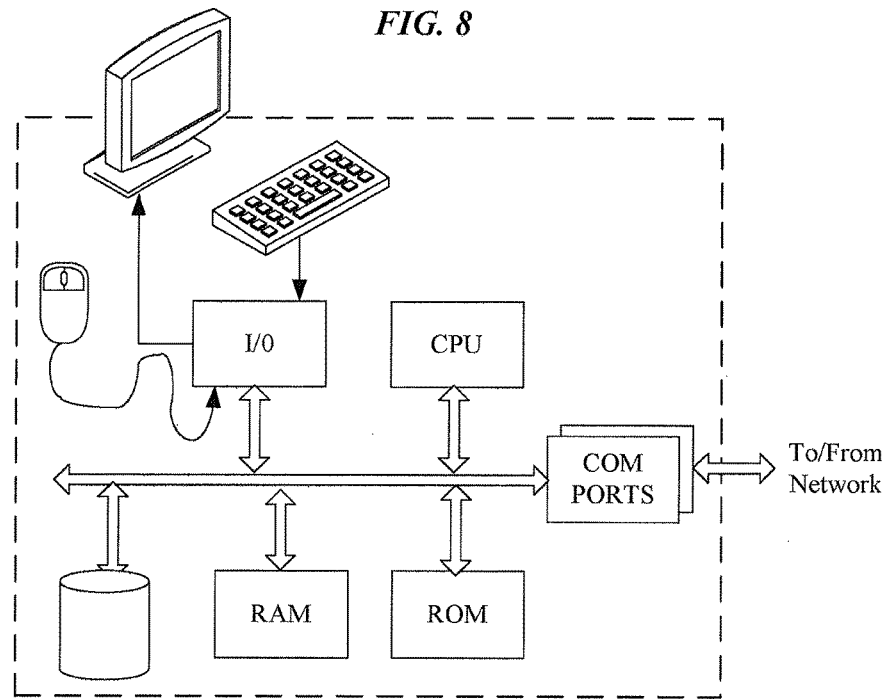
FIG. 8 is a simplified functional block diagram of a personal computer or other user terminal device, which may be used as the remote access terminal, in a system like that of FIG. 1.
Figure 7:
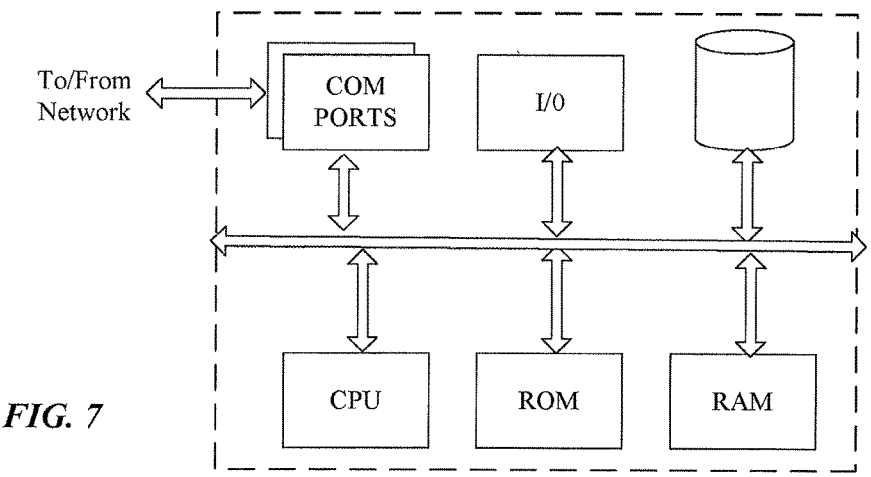
FIG. 7 is a simplified functional block diagram of a computer configured as a host or server, for example, to function as the server in a system like that of the example of FIG. 1.

As described above, at least some functions of devices associated or in communication with the networked system encompassing the intelligent lighting devices 37 of FIG. 1, with which portable device 63 communicate, may be implemented with general purpose computers or other general purpose user terminal devices, although special purpose devices may be used. FIGS. 7 and 8 provide functional block diagram illustrations of exemplary general purpose hardware platforms.

FIG. 7 illustrates a network or host computer platform, as may be used to implement a host or server, such as the computers 56 and 57, shown in FIG. 1. FIG. 8 depicts a computer with user interface elements, that implement a personal computer or other type of work station or terminal device, such as terminal device 59, although the computer of FIG. 8 may also act as a server if appropriately programmed. As described above, the hardware platform of FIG. 4 represents an example of a portable device, such as a tablet computer, smartphone (e.g. 63 in FIG. 1) or the like with a network interface to a wireless link and may be implemented in several form factors, smart phone, tablet, or wearable device, for example. It is believed that those skilled in the art are familiar with the structure, programming and general operation of such computer equipment and as a result the drawings should be self-explanatory.

A server (see FIG. 7), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. Also, a computer configured as a server with respect to one layer or function may be configured as a client of a server in a different layer and/or for a different function.

A computer type user terminal device (see FIG. 8), such as a desktop or laptop type personal computer (PC), similarly includes a data communication interface CPU, main memory (such as a random access memory (RAM)) and one or more disc drives or other mass storage devices for storing user data and the various executable programs. A mobile device (see FIG. 4) type user terminal may include similar elements, but will typically use smaller components that also require less power, to facilitate implementation in a portable form factor. The computer hardware platform of FIG. 7 and the terminal computer platform of FIG. 8 are shown by way of example as using a RAM type main memory and a hard disk drive for mass storage of data and programming, whereas the mobile device of FIG. 4 includes a flash memory and may include other miniature memory devices. It is noted, however, that more modern computer architectures, particularly for portable usage, are equipped with semiconductor memory only.

Although FIGS. 4, 7 and 8 in their present form show computers and user terminal devices, generally similar configurations also may be used within other elements of the lighting system and/or as user wearable devices. For example, one implementation of the control, communication and interface elements of a lighting device may utilize an architecture similar to that of one of the computers or mobile terminals. As a more specific example, the personal computer type hardware in FIG. 8 (except for the keyboard, mouse and display) could serve as the control and communication elements of a lighting device, where the input/output interface I/O interfaces to an appropriate light driver and to any sensor(s) or other enhancement input or output device(s) included within the lighting device. As another example, some types of portable devices might utilize an arrangement similar to the mobile device of FIG. 4, albeit possibly with only one wireless transceiver compatible with the relevant networking technology and smaller/lower capacity electronics (e.g. to reduce costs, size and/or power consumption).

As also outlined above, aspects of the lighting related operations of the portable device may reside in software programs stored in the memories, RAM, ROM or mass storage. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the portable device, navigational programming, and image processing to locate portable devices having gated retro-reflectors, including object recognition and data management computer application software from one computer or processor into another, for example, from a management server or host computer of a lighting system service provider (e.g. implemented like the server computer shown at 57) into any of the lighting devices 37 or the portable devices 63. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible, "storage" type media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A device, comprising:
   a retro-reflector having a front face configured to retro-reflect incident light back toward a modulated light source;
   a gating shutter coupled between the retro-reflector and the modulated light source the gating shutter being configured to be in open and closed states in response to a control signal, wherein the gating shutter permits passage of light to and from the retro-reflector in the open state and reduces the passage alight in the closed state;
   a light sensor configured to receive and detect light including visible light communication (VLC) data from the modulated light source, the VLC data being received during VLC intervals in which a first VLC light pulse received during a first one of the VLC intervals represents at least a portion of a first VLC data symbol and presence of a second VLC light pulse during a second one of the VLC intervals represents at least a portion of a second VLC data symbol; and a controller coupled to the light sensor and to the gating shutter, the controller controlling the gating shutter to be in the open state during the reception of the first light pulse to upload a first symbol and to be in the closed state during the reception of the second light pulse to upload a second symbol.

2. The device of claim 1, wherein:
the controller synchronizes the opening and closing of the gated shutter to the VLC intervals and the controller controls the gating shutter to be in the open or closed states at times substantially coincident with respective ones of the VLC intervals in which the VLC light pulses are received.

3. The device of claim 1, wherein the retro-reflector is selected from a group consisting of a spherical-lens retro-reflector and a cube-corner retro-reflector.

4. The device of claim 1, wherein the retro-reflector includes a material having a first index of refraction embedded in the gating shutter, the gating shutter including a material having a variable index of refraction that changes from the first index of refraction to a second index of refraction in response to the control signal.

5. The device of claim 4, wherein:
the retro-reflector material having the first index of refraction is a polymer material;
the material having the variable index of refraction is a liquid crystal material; and
the gating shutter comprises first and second transparent electrodes responsive to the control signal to selectively subject the liquid crystal material to an electric field to cause the liquid crystal material to switch between the first and second indexes of refraction.

6. The device of claim 1, wherein the gating shutter is a liquid crystal device configured between the front face of the retro-reflector and the modulated light source and the control signal causes the liquid crystal device to selectively allow and block the retro-reflector from receiving and retro-reflecting light from the modulated light source.

7. The device of claim 1, wherein:
the gating shutter includes a material selected from a group consisting of a saturable absorber and a reverse saturable absorber;
the gating shutter is configured between the front face of the retro-reflector and the modulated light source; and
the control signal selectively applies light energy to the gating shutter material to cause the gating shutter material to selectively allow or block transmission of light from the modulated light source to and from the retro-reflector.

8. The device of claim 1, wherein:
the gating shutter includes a photonic crystal configured between the front face of the retro-reflector and the modulated light source and the control signal causes the photonic crystal to selectively expand or contract to cause the photonic crystal to switch between transmitting and blocking light in a predetermined wavelength band.

9. The device of claim 8, wherein:
the photonic crystal includes a piezoelectric material and first and second electrodes on respective first and second sides of the piezoelectric material, both the piezoelectric material and the first and second electrodes being transparent to light in the predetermined wavelength band; and the control signal selectively applies first and second electric charges across the first and second electrodes to cause the piezoelectric material to respectively expand and contract.

10. The device of claim 8, wherein:
the photonic crystal includes a temperature-sensitive material and a heating element, both the temperature-sensitive material and the heating element being transparent to light in the predetermined wavelength band; and
the control signal causes the heating element to selectively apply and not apply heat to the heat sensitive material to cause the heat sensitive material to respectively expand and contract.

11. The device of claim 1, wherein the light sensor includes a camera.

12. The device of claim 1, wherein the light sensor includes at least one sensor selected from a group consisting of a photodiode, a phototransistor, a photoresistor and a photomultiplier.

13. A portable device comprising:
a housing having a first surface and a second surface;
a first retro-reflector mounted on the first surface of the housing such that a retro-reflecting front face of the first retro-reflector points away from the first surface;
a second retro-reflector mounted on the second surface of the such that a retro-reflecting front face of the second retro-reflector points away from the second surface;
a first gating shutter mounted on top of the front face of the first retro-reflector and a second gating shutter mounted on top of the front face of the second retro-reflector, wherein the first and second gating shutters are controlled by respective first and second control signals, to be in open and closed states, wherein each of the first and second the gating shutters permits passage of light to and from the retro-reflector in the open state and reduces the passage of light in the closed state;
a light sensor configured to receive and detect light including visible light communication (VLC) data from a modulated light source, the VLC data being received at regular intervals in which a first VLC light pulse received during a first one of the intervals represents at least a portion of a first VLC data symbol and presence of a second VLC light pulse during a second one of the intervals represents at least a portion of a second VLC data symbol; and
a controller coupled to the light sensor and to the first and second gating shutters, the controller controlling at least one of the first and second gating shutters to be in the open state during the reception of the first light pulse to upload a first symbol and for controlling at least one of the first and second gating shutters to be in the closed state during the reception of the second light pulse to upload a second symbol.

14. The portable device of claim 13, wherein the first and second gating shutters are connected in parallel and the controller configures both of the first and second gating shutters to be in the open state bring the reception of the first VLC light pulse and controls both of the first and second gating shutters to be in the closed state during the reception of the second VLC light pulse.

15. The portable device of claim 13, wherein:
the light sensor is mounted on the first surface of the housing;

the portable device further comprises a further light sensor mounted on the second surface of the housing, the further light sensor being configured to receive the VLC data symbols; and the controller is coupled to the light sensors mounted on the first and second surfaces of the housing and to the first and second gating shutters, the controller controlling the first gating shutter be in the open state responsive to the light sensor mounted on the first surface of the housing receiving the first VLC light pulse and controlling the second gating shutter to be in the open state responsive to the light sensor mounted on the second surface of the housing receiving the second VLC light pulse.

16. The portable device of claim 13 wherein:

the portable device is a mobile telephone having a front camera and a rear camera;

the light sensor is the front camera; and the further light sensor is the rear camera.

17. The portable device of claim 13, wherein:

the portable device is a mobile telephone having a front light sensor and a rear light sensor, and each of the front and rear light sensors is selected from a group consisting of a photodiode, a phototransistor, a photoresistor and a photomultiplier.

18. The portable device of claim 13 wherein:

the housing includes a third surface;

the portable device further includes:

a third retro-reflector mounted on the third surface of the such that a retro-reflecting front face of the third retro-reflector points away from the third surface;

a third gating shutter mounted on top of the front surface of the third retro-reflector; and the controller is configured to control the first, second and third gating shutters to send uplink data from the portable device responsive to receiving the VLC light pulses.

19. A method, comprising:

receiving visible light communication (VLC) download data from a modulated light source, including receiving, during a first VLC interval, a first VLC light pulse representing at least a portion of a first downloaded VLC data symbol and receiving during a second VLC interval, a second VLC light pulse representing at least a portion of a second downloaded VLC data symbol;

opening a gating shutter over a retro-reflector during the first VLC interval to send a reflection of the first VLC light pulse toward the modulated light source, the reflection of the first VLC light pulse representing a first uploaded symbol; and closing the gating shutter over the retro-reflector during the second VLC interval to block reflection of the second VLC light pulse, the lack of reflection of the second VLC light pulse representing a second uploaded symbol.

20. The method of claim 19, further including:

synchronizing the opening and closing of the gated shutter to the first and second VLC intervals, wherein the opening and closing of the gating shutter is synchronized to be substantially coincident with respective ones of the VLC intervals in which the VLC light pulses are received.

21. A system, comprising:

a visible light communication (VLC) transceiver comprising:

a VLC light source configured to transmit VLC data at regular intervals in which a light pulse transmitted during one of the intervals represents a first symbol and absence of a light pulse during another one of the intervals represents a second symbol; and a first light sensor; coupled to the VLC light source and configured to receive uplink data symbols during intervals in which the VLC data is transmitted as light pulses; and a device comprising:

a second light sensor configured to receive the VLC symbols;

a retro-reflector having a front face configured to retro-reflect the VLC symbols to the first light sensor;

a gating shutter coupled between the retro-reflector and the VLC light source, the gating shutter being configured to switch between open and closed states respectively, wherein the gating shutter passes light in the open state and blocks light in the closed state; and a controller coupled to the second light sensor and to the gating shutter, the controller generating the control signal to control the gating shutter to send the uplink symbols from the device responsive to receiving one of the VLC light pulses;

wherein the controller opens the gating shutter during the reception of one of the VLC symbols to upload a first symbol and closes the gating shutter during the reception of one of the VLC symbols to upload a second symbol.

* * * * *